United States Patent
Turek et al.

(10) Patent No.: US 12,247,897 B1
(45) Date of Patent: Mar. 11, 2025

(54) METHOD AND APPARATUS FOR AUTOMATED GAS TURBINE ENGINE TESTING

(71) Applicant: Pratt & Whitney Canada Corp., Longueuil (CA)

(72) Inventors: Bernard Turek, Rzeszów (PL); Piotr Dywoniak, Nagawczyna (PL); Jan Długosz, Żarnowa (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/238,316

(22) Filed: Aug. 25, 2023

(51) Int. Cl.
  *G01M 15/14* (2006.01)
  *F02C 9/46* (2006.01)

(52) U.S. Cl.
  CPC .............. *G01M 15/14* (2013.01); *F02C 9/46* (2013.01)

(58) Field of Classification Search
  CPC . F02C 3/04; F02C 9/46; G01M 15/02; G01M 15/14; F05D 2260/81
  See application file for complete search history.

(56) References Cited

U.S. PATENT DOCUMENTS

| | | | |
|---|---|---|---|
| 4,821,217 A | 4/1989 | Jackson | |
| 5,293,775 A * | 3/1994 | Clark | G01M 9/04 73/147 |
| 6,138,081 A | 10/2000 | Olejack | |
| 10,067,035 B2 | 9/2018 | Bowler | |
| 10,809,156 B2 | 10/2020 | Demarco | |
| 2003/0045992 A1 | 3/2003 | Humerickhouse | |
| 2008/0314134 A1 | 12/2008 | Mainville | |
| 2014/0102179 A1 | 4/2014 | Ekanayake | |
| 2016/0290280 A1 * | 10/2016 | Blankenship | G01M 15/14 |
| 2017/0216637 A1 | 8/2017 | Raimarckers | |
| 2018/0283200 A1 | 10/2018 | Gill | |

FOREIGN PATENT DOCUMENTS

CN 111426482 B 3/2021

OTHER PUBLICATIONS

EP Search Report for EP Patent Application No. 24196298.4 dated Jan. 23, 2025.

* cited by examiner

*Primary Examiner* — David E Sosnowski
*Assistant Examiner* — Maxime M Adjagbe
(74) *Attorney, Agent, or Firm* — Getz Balich LLC

(57) ABSTRACT

An automated test cell and method for testing a gas turbine test engine is provided. The automated test cell includes a fuel subsystem, an engine lubrication subsystem, a test cell security subsystem, and a system controller. The system controller is in communication with the fuel subsystem, the engine lubrication subsystem, the test cell security subsystem, and a non-transitory memory storing instructions. The instructions when executed cause the system controller to: operate the test engine pursuant to a predetermined test cycle, including producing test data; control the engine lubrication subsystem to provide lubrication to the test engine pursuant to the predetermined test cycle; control the fuel subsystem to provide fuel to the test engine pursuant to the predetermined test cycle; control the test cell security subsystem to monitor an environment within the test cell; and report the test data.

20 Claims, 3 Drawing Sheets

METHOD AND APPARATUS FOR AUTOMATED GAS TURBINE ENGINE TESTING

BACKGROUND OF THE INVENTION

1. Technical Field

The present disclosure relates to methods and apparatus for testing gas turbine engines.

2. Background Information

New and overhauled aircraft engines are subjected to extensive testing as a prerequisite before being brought into service. Certain tests may be performed with the engine in a nonoperational mode (e.g., no ignition) but other tests are performed while the engine is running in a test cell. Using conventional test procedures, engine operation testing tends to be labor intensive. Currently, test cell operations are performed by a test cell operator (e.g., a test engineer) that must be present during engine operation to conduct the testing and to collect data. Because certain tests require a substantial amount of time, more than one test cell operator may be tasked with performing the tests. As a result, tests that are performed repetitively may not be performed in the exact same manner each time (human variation) and the test data may be tainted as a result. In addition, many of the tests are performed over a significant period time that may exceed the daily working hours of a test engineer or may run beyond a test engineer's work week. In these instances, under conventional practices the testing may be suspended overnight, or over a weekend, or over a holiday, or the like, thereby extending the time frame necessary to perform the testing.

What is needed is an improved method and system that overcomes the shortcomings of the existing test practices.

SUMMARY

According to an aspect of the present disclosure, an automated test cell for testing a gas turbine test engine is provided. The automated test cell includes a fuel subsystem, an engine lubrication subsystem, a test cell security subsystem, and a system controller. The system controller is in communication with the fuel subsystem, the engine lubrication subsystem, the test cell security subsystem, and a non-transitory memory storing instructions. The instructions when executed cause the system controller to: operate the test engine pursuant to a predetermined test cycle, including producing test data; control the engine lubrication subsystem to provide lubrication to the test engine pursuant to the predetermined test cycle; control the fuel subsystem to provide fuel to the test engine pursuant to the predetermined test cycle; control the test cell security subsystem to monitor an environment within the test cell; and report the test data.

In any of the aspects or embodiments described above and herein, the instructions when executed may cause the system controller to control the test cell security subsystem to monitor the test cell environment for fire.

In any of the aspects or embodiments described above and herein, the monitoring of the test cell environment for fire may include sensing for combustion gases and/or thermal sensing.

In any of the aspects or embodiments described above and herein, the instructions when executed may cause the system controller to control the test cell security subsystem to monitor the test cell environment for fuel leakage, and in the event a fuel leakage is detected, may control the fuel subsystem to close down.

In any of the aspects or embodiments described above and herein, the instructions when executed may cause the system controller to control the test cell security subsystem to monitor the test cell environment for fuel fumes, and in the event said fuel fumes are detected, may control the fuel subsystem to close down.

In any of the aspects or embodiments described above and herein, the instructions when executed may cause the system controller to control the test cell security subsystem to monitor the test cell environment for fire, and in the event fire is detected the instructions may cause the system controller to control the test cell security subsystem to initiate fire extinguishing steps. The fire extinguishing steps may include controlling one or more fire extinguishing devices, and may include controlling the fuel subsystem and the engine lubrication system to close down.

In any of the aspects or embodiments described above and herein, the automated test cell may include a test cell engine airflow subsystem, and the fire extinguishing steps may include controlling the test cell engine airflow subsystem to stop an influx of air into the test cell in the event fire is detected.

In any of the aspects or embodiments described above and herein, the automated test cell may include an engine air bleed subsystem, and the instructions when executed may cause the system controller to control the engine air bleed subsystem to bleed gas path air from a compressor section of the test engine during the predetermined test cycle.

In any of the aspects or embodiments described above and herein, the automated test cell may include an engine load subsystem, and the instructions when executed may cause the system controller to control the engine load subsystem to selectively apply a load to the test engine during the predetermined test cycle.

According to an aspect of the present disclosure, a method for testing a gas turbine test engine within a test cell is provided. The method includes: engaging the test engine with a fuel subsystem configured to selectively provide a flow of fuel to the test engine and an engine lubrication subsystem configured to selectively provide a flow of lubricant to the test engine; operating the test engine within the test cell using a system controller that is in communication with the fuel subsystem and the lubrication subsystem, the operation of the test engine using the system controller including operating the test engine according to a predetermined test cycle and producing test data representative of the test engine operation; and monitoring the operation of the test engine within the test cell during the predetermined test cycle using a test cell security subsystem that is in communication with the system controller, wherein the monitoring includes monitoring an environment within the test cell during the predetermined test cycle.

In any of the aspects or embodiments described above and herein, the test engine operation monitoring within the test cell during the predetermined test cycle using a test cell security subsystem may include sensing for combustion gases indicative of a fire.

In any of the aspects or embodiments described above and herein, the method may include controlling the test cell security subsystem to initiate fire extinguishing steps in the event the monitoring step detects fire, and may include controlling the fuel subsystem and the engine lubrication system to close down in the event of fire, and may include sealing the test cell to stop an influx of air into the test cell in the event of fire.

In any of the aspects or embodiments described above and herein, the method may include monitoring the test cell for fuel leakage or fuel fumes during the operation of the test engine according to the predetermined test cycle.

In any of the aspects or embodiments described above and herein, the method may include using the system controller to control an engine air bleed subsystem to bleed gas path air from a compressor section of the test engine during the predetermined test cycle.

In any of the aspects or embodiments described above and herein, the method may include using the system controller to control an engine load subsystem to apply a load to the test engine during the predetermined test cycle.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
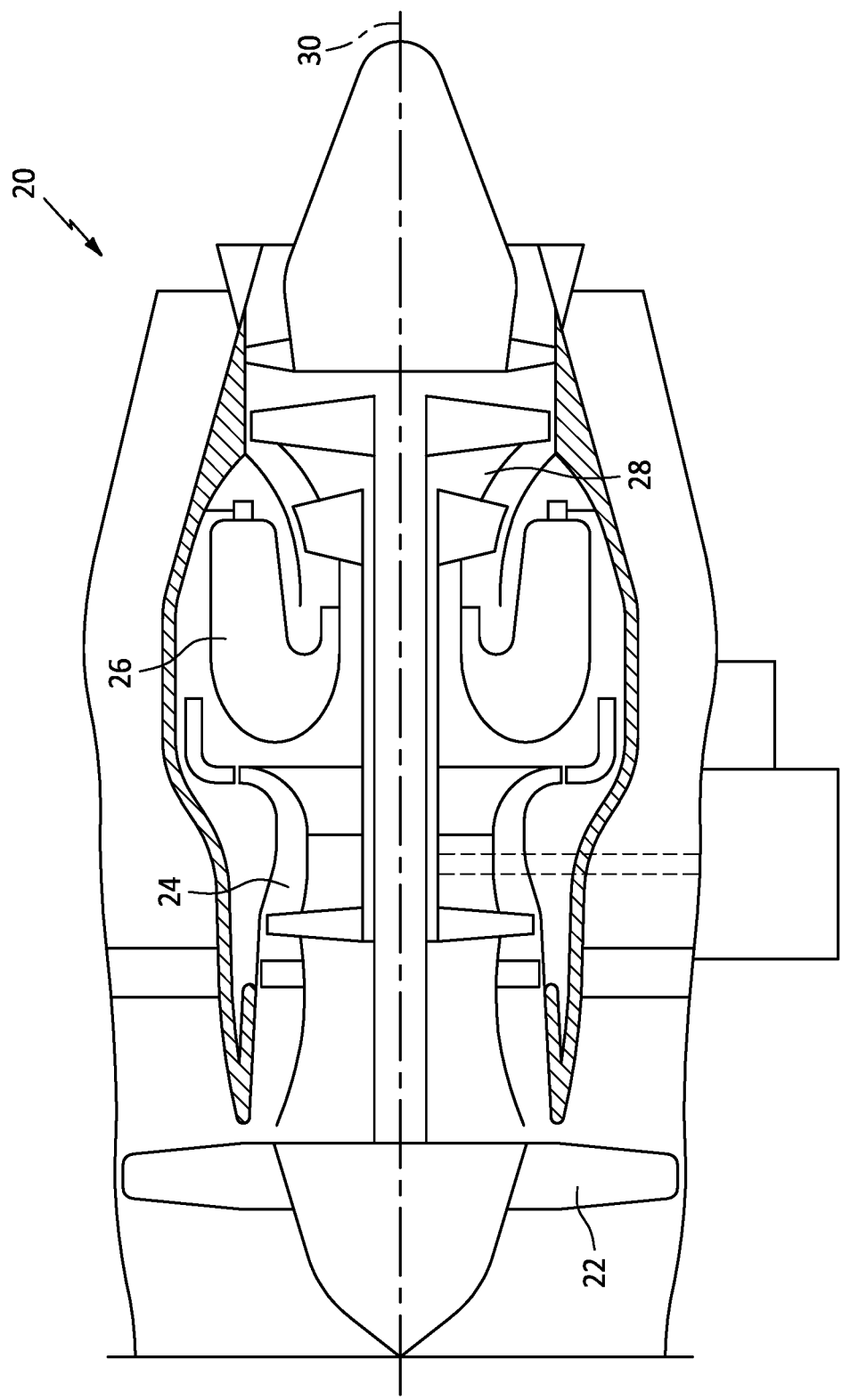
FIG. 1 is a diagrammatic sectional view of a gas turbine engine embodiment.

The present disclosure is directed to an automated gas turbine engine test cell and method for using the same. FIG. 1 diagrammatically illustrates an example of a gas turbine engine 20 that may be tested using the present disclosure method and system. The gas turbine engine 20 has in serial flow communication a fan section 22, a compressor section 24, a combustor 26, a turbine section 28, and an axial centerline 30. The present disclosure may be utilized with a variety of different gas turbine engine types, including turboprop engines, turboshaft engines, turbojet engines, a propfan engines, open rotor engines, auxiliary power units (APU), or the like.

Embodiments of the present disclosure automated test cell 32 includes a plurality of test cell engine subsystems 34, a security subsystem 36, a system controller 38, and input and output devices.

The test cell engine subsystems 34 may include one or more of a fuel subsystem 34A, an engine air bleed subsystem 34B, an environmental temperature subsystem ("E-Temp") 34C, an engine airflow subsystem 34D, an engine lubrication subsystem ("Engine Lube") 34E, and an engine load subsystem 34F, and combinations thereof. The listed subsystems 34A-F represent examples of test cell engine subsystems 34 that may be included in the present disclosure test cell 32. The present disclosure test cell 32 may include fewer, or more, and/or different engine subsystems 34.

During testing, a gas turbine engine (i.e., a "test engine 40") may be mounted, for example, on a test frame (not shown) within the test cell 32. The test frame is configured to support the test engine 40 and to keep the test engine 40 substantially stationary relative to the ground. The present disclosure is not limited to any particular test frame configuration or other structure for holding the test engine 40.

The fuel subsystem 34A may include a fuel storage device (e.g., a tank) configure to store a sufficient amount of the type of fuel combusted within the test engine 40. In some embodiments, the fuel subsystem 34A or the test engine itself may include a pump configured to provide a volumetric flow of fuel from the storage device to the test engine 40. The fuel subsystem 34A may include one or more valving/metering devices controllable to provide a desired amount of fuel to the test engine 40 for the operating conditions of the engine; e.g., a fuel flow appropriate for idle when the test engine 40 is operating in an idle state, a fuel flow appropriate for cruise when the test engine 40 is operating in a cruise state, and so on. The fuel subsystem 34A may include sensors configured to measure the fuel flow (e.g., measure the volumetric fuel flow rate) during use. In some embodiments, the fuel subsystem 34A may include safety valving that is configured to shut off the flow of fuel to the test engine 40 in the event of an issue during testing.

The engine air bleed subsystem 34B may be configured to replicate gas path air bleeding applications so that the present disclosure test cell 32 can replicate actual engine operating conditions. Gas turbine engines in normal operation very often include structure for continuously or selectively bleeding air from the gas path of the engine. Air bled from the gas path within the compressor section of the gas turbine engine may be used for a variety of different purposes including use within an aircraft cabin environment control systems, for compressor operability, to provide engine starting air (e.g., produced by an APU), to produce a load on the test engine 40, and the like. The engine air bleed subsystem 34B may be configured to replicate at least some of these gas path air bleeding applications so that the engine testing can replicate actual operating conditions. For example, to replicate an engine operating system wherein the test engine 40 would normally be subject to selective bleeding of compressor gas path air, the engine air bleed subsystem 34B may be configured to be in fluid communication with the test engine 40 so as to receive bleed air from the test engine 40 at the appropriate ports. The engine air bleed subsystem 34B may include downstream valving or the like that alters the downstream flow of the bleed air (e.g., closes the flow entirely or partially) in a manner that replicates gas path air bleeding during takeoff, during ascent, cruise, during descent, and the like. The engine air bleed subsystem 34B is configured to control and measure the volumetric rate of airflow being bled from the test engine 40.

The environmental temperature subsystem ("E-Temp") 34C is configured to create a temperature environment within the test cell 32 that improves the ability of the test cell 32 to operate the test engine 40 during testing; e.g., the environmental temperature subsystem 34C heats or cools the air within the test cell 32 as desired for the test at hand.

The test cell engine airflow subsystem 34D is configured to handle air intake into and engine exhaust from the test cell 32. The intake portion of this subsystem 34D provides the volumetric air requirements for all of the engine operation conditions tested within the test cell 32; e.g., idle, takeoff, cruise, etc. The exhaust portion of this subsystem 34D provides structure to handle the exhaust produced by the test engine 40 under all engine operation conditions tested within the test cell 32; e.g., idle, takeoff, cruise, etc. Both the intake and exhaust portions may be configured to close in the event of an issue arising during the testing process. For example, in the event a fire is detected within the test cell 32, the intake and the exhaust portions may be closed to prevent an influx of air. The apparatus utilized to close the intake and/or exhaust portions may be controlled to coordinate the timing of the closing based on the operating condition of the engine being tested.

During normal flight operations, engine lubricant (e.g., "oil") is cycled through a gas turbine engine to cool and/or lubricate engine components via a lubrication system. The lubrication system is configured to provide a lubricant flow to, and recover lubricant from, engine components. The lubrication system may include elements that are integral with the engine and may include elements that are independent of, but in communication with, the engine. To the extent that elements of an aircraft lubrication system are not present on the test engine 40, or are inoperable on the test engine 40, the present disclosure engine lubrication subsystem ("Engine Lube") 34E provides those elements (or elements that are functionally equivalent) to enable satisfaction of the lubrication requirements of the test engine 40 for all engine operating conditions tested within the test cell; e.g., idle, takeoff, cruise, etc. To satisfy lubricant cooling requirements, for example, embodiments of the present disclosure engine lubrication subsystem 34E may include one or more heat exchangers in communication with a cooling medium sufficient to control the lubricant temperature for all of the aforesaid testing operating conditions. Embodiments of the present disclosure engine lubrication subsystem 34E may also include elements necessary to satisfy the lubricant flow requirements of the test engine 40; e.g., elements that provide a flow of lubricant flow to and from the test engine 40 such as a supply pump, a scavenge pump, a tank, a deaerator, valving, and the like, and any combination thereof.

During normal flight operations, systems within an aircraft will apply a load onto the engine. There may be a number of different systems/elements that may cause a load to be applied to an engine; e.g., an electric generator, a propulsor, a pump, and the like. The present disclosure engine load subsystem 34F is configured to apply a load to the test engine 40 that simulates various engine operating conditions tested within the test cell; e.g., idle, takeoff, cruise, etc. As an example, the engine load subsystem 34F may be configured to apply a load to the test engine 40 that replicates the load that an electric generator would apply to the test engine 40 during engine operating conditions.

The test cell security subsystem 36 may include fire detection devices, fire extinguishing devices, fuel leakage sensors, and fuel fume sensors. In some embodiments, the test cell security subsystem 36 may include personnel presence detectors. The fire detection devices may include smoke sensors, combustion gas sensors (e.g., CO2), heat sensors (e.g., thermocouples), optical flame detectors (e.g., "fire eyes"), and the like, or any combination thereof. The present disclosure is not limited to any particular fire detection devices other than those suitable to be used in the test cell environment. The fire extinguishing devices may include a gaseous environment system configured to fill the test cell 32 with an inert gas that is not combustible. In the event a fire starts, the air within the test cell 32 may be replaced with the inert gas. The replacement of air with the inert gas will cause the fire to starve from lack of oxygen, and thereby self-extinguish. The present disclosure is not limited to any particular fire extinguishing devices other than one that is suitable to be used in the test cell environment. The present disclosure is not limited to any particular fuel leakage sensor and/or fuel fume sensors other than those suitable to be used in the test cell environment. In those embodiments of the test cell security subsystem 36 that include a personnel presence sensing device, the device is configured to sense the presence of a person within the test cell. The device may include motion sensors, or cameras, or the like that provide an indication of the presence of a person within the test cell. The present disclosure is not limited to any particular type of personnel presence detectors other than one that is suitable to be used in the test cell environment.

The system controller 38 may include one or more processors in signal communication with a memory device. The processor may include any type of computing device, computational circuit, processor(s), CPU, computer, or the like capable of executing a series of instructions that are stored in the memory. Instructions can be directly executable or can be used to develop executable instructions. For example, instructions may be executable or non-executable machine code or a high-level language that can be compiled to produce executable or non-executable machine code, or any combination thereof. Instructions may include data. Instructions may be organized in any format, including routines, subroutines, programs, data structures, objects, modules, applications, applets, functions, etc. Instructions may include an operating system, and/or executable software modules such as program files, system data, buffers, drivers, utilities, and the like. The instructions may apply to any test cell 32 functionality described herein. The memory may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be integral with the system controller 38 or may be independent of, but in communication with, the system controller 38. The system controller 38 may include, or may be in communication with, an input device that enables a user to enter data and/or instructions, and may include, or be in communication with, an output device configured, for example to display information (e.g., a visual display or a printer), or to transfer data, etc. The present disclosure test cell embodiment diagrammatically shown in FIG. 2 includes a programmable logic controller smart panel ("PLC smart panel") and a PLC human-machine interface ("PLC HMI") that may be configured as input devices, or output devices, or both. The test cell embodiment shown in FIG. 2 also includes a "logsheet" which may be an input/storage device that can be used test personnel to input test data for storage purposes. The logsheet may be used to record all of the steps taken during the testing, to record engine and/or test parameters, input from test cell systems and subsystems, operator notes, and the like. The input from test cell systems and subsystems may include, for example, input from the various test cell security subsystems (e.g., signals indicating "fire detection devices operational", "no fuel leakage sensed", "no fuel fumes sensed", "test cell temperatures", and the like) to provide a record of all important parameters occurring during the testing. The logsheet may be configured to time stamp all input such that the record is complete as a function of time. The test cell 32 embodiment shown in FIG. 2 also includes a block labeled "operator communications" and visual surveillance" in communication with the system controller 38. These aspects may be an input/output device wherein test cell management information (e.g., current test cycle, current test data, user control input prompts, and the like) and visual monitoring images of the test cell 32 may be provided. The input and/or output devices may be disposed locally with the test cell 32 and/or may be located remotely; e.g., to enable oversight from a remote location. The "engine FADEC" block shown in the system controller 38 diagrammatically represents stored instructions as may be provided in the full authority digital engine control (FADEC) used to control the test engine 40 in a given aircraft application. The "engine FADEC" block represents instructions that may be used to control the test engine 40 under all engine operating conditions tested within the test cell 32; e.g., idle, takeoff, cruise, and the like. The "DAS" block shown in the system controller 38 diagrammatically represents stored instructions directed toward data acquisition. For example, during the testing engine performance data is collected; e.g., temperatures, pressures, rotor speeds, and the like. The data acquisition system ("DAS") may be configured to collect and organize that data for subsequent analysis to evaluate the performance of the test engine 40 under the test conditions. Communications within the test cell 32 (e.g., within the system controller 38, or between the system controller 38 and other test cell 32 components may be via a hardwire connection or via a wireless connection. A person of skill in the art will recognize that portions of the system controller 38 may assume various forms (e.g., digital signal processor, analog device, etc.) capable of performing the functions described herein. The functions of the system controller 38 described herein may be performed by an independent system controller 38 or alternatively some or all of the system controller 38 functions may be performed by a plurality of different controllers.

As stated above, gas turbine engines may be tested off wing in a test cell to ensure characteristics relating to performance, durability, reliability, and the like. The testing may be configured to control and verify engine and engine system functions, verify engine parameters, verify engine reliability and durability, verify engine performance, and the like. The testing likely includes a substantial number of testing cycles at different loadings, at different rotational speeds, and the like, performed relative to predetermined codes and standards.

Also as stated above, under current practices test cell operations are performed by a test cell operator present at the test cell during testing. The testing may include performing tests repeatedly under different parameters and typically takes a substantial amount of time. As a result, tests may be performed by different test cell operators (which may introduce human variable error) and the test data may be tainted as a result. In addition, many of the tests are performed over a significant period of time. Testing that is not completed in a given work day or in a given week, may be suspended until the next work day or suspended over the weekend. In some instances, resumption of the testing requires additional time to bring the engine (and/or collateral systems) up to speed for the test at hand.

The present disclosure automated test cell 32 and method provides a substantial improvement over current test cell systems and practices. In particular, the present disclosure automated test cell 32 and method permits automated testing that does not require a test cell operator to perform the tests. On the contrary, once testing is initiated under the present disclosure the testing is performed in an automated fashion, and can be performed non-stop (e.g., on a twenty-four hour basis, on traditional workdays, or weekend days, or during holidays, or the like).

Figure 2:
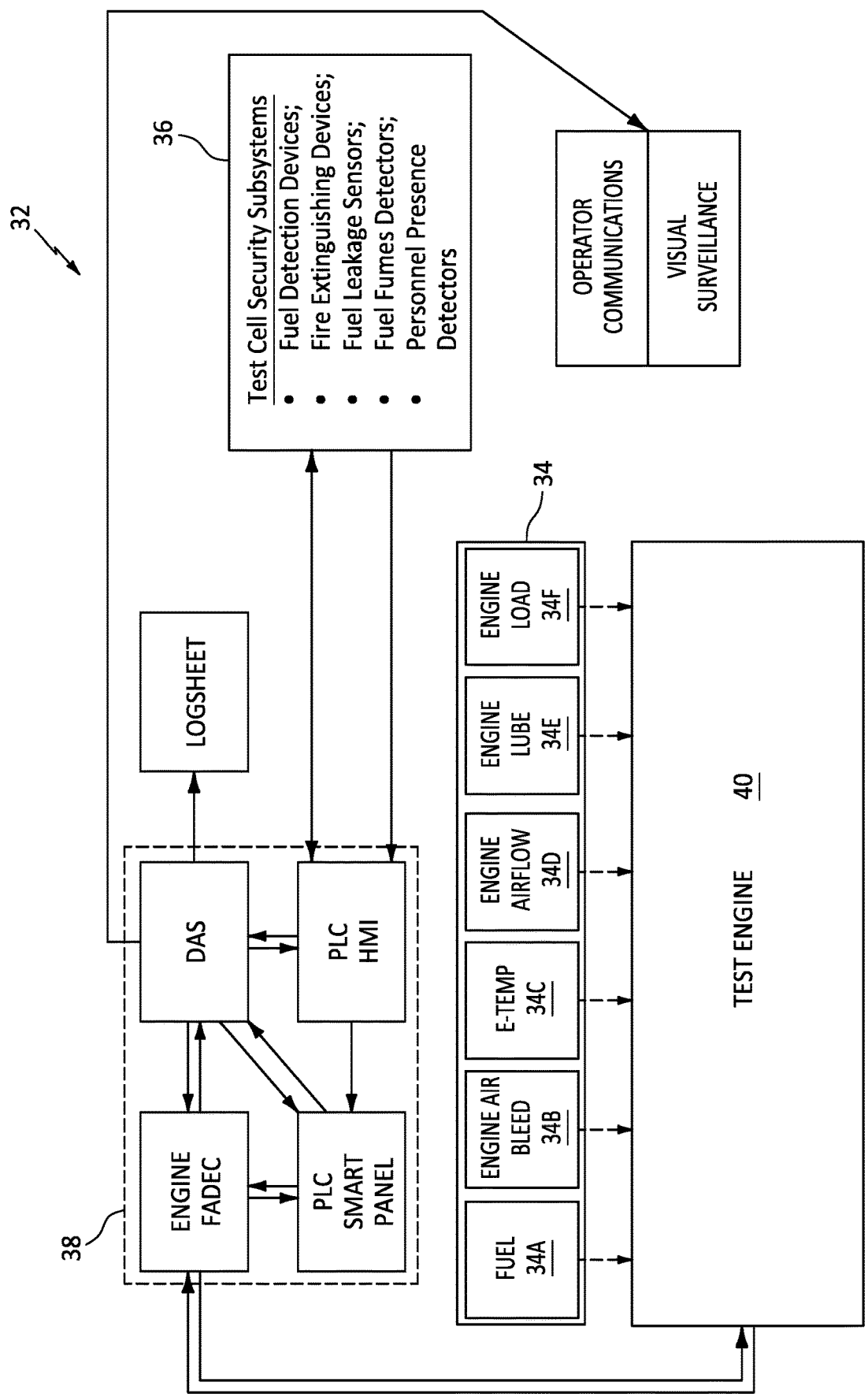
FIG. 2 is a schematic representation of a present disclosure test cell embodiment.
Figure 3:
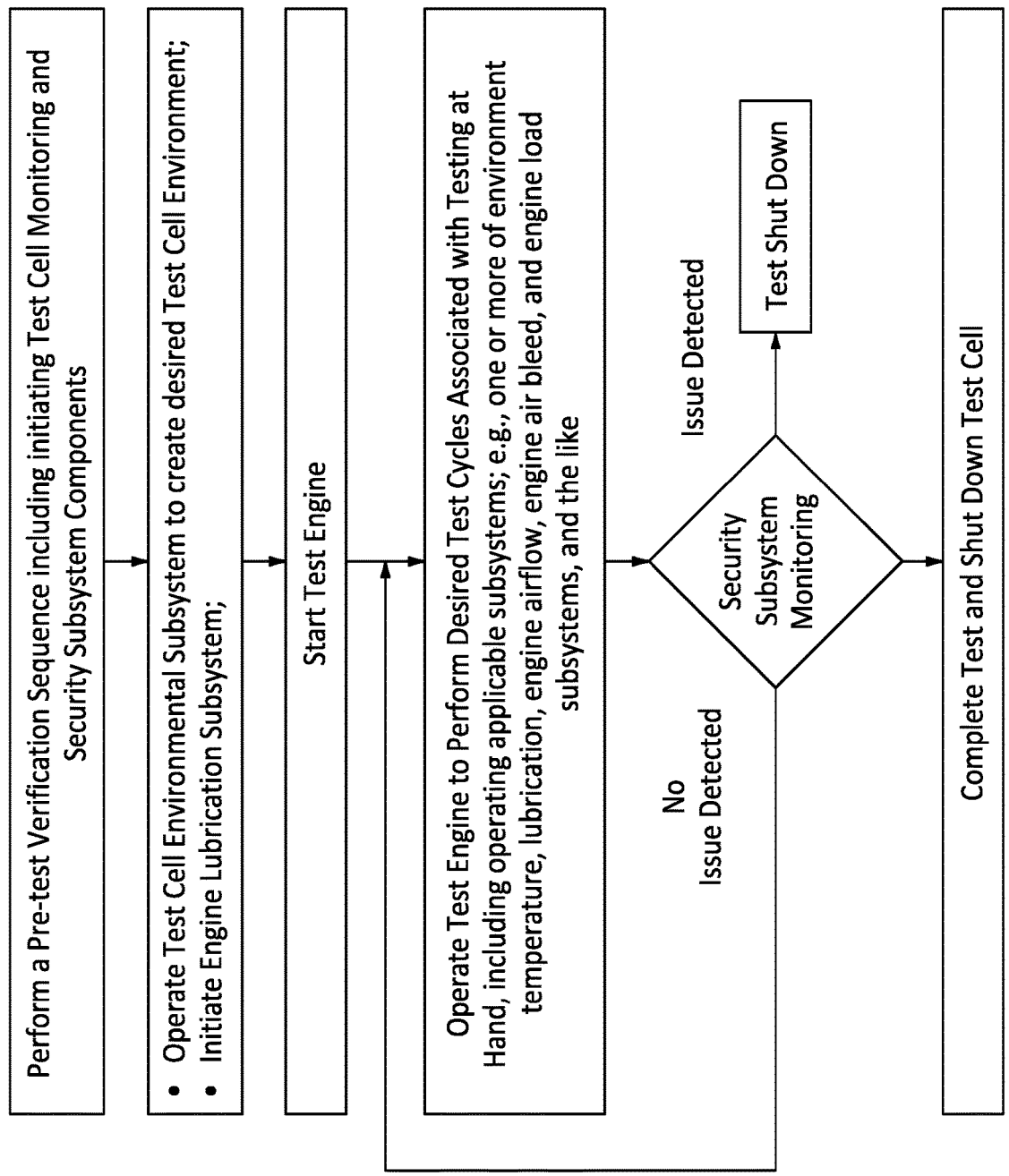
FIG. 3 is a flow chart of an embodiment of a present disclosure test cell operation.

Referring to FIGS. 2 and 3, to illustrate the substantial utility of the present disclosure, an example of how the present disclosure test cell 32 may be operated is hereinafter provided. The test engine 40 may be mounted on a test frame within the present disclosure test cell 32. Depending on the testing to be completed, various present disclosure subsystems are engaged with the test engine 40. For example, prior to testing the environmental temperature subsystem 34C may be controlled to establish a desired test cell air temperature. During the testing, the environmental temperature subsystem 34C may be controlled to maintain the desired test cell air temperature or to change the test cell air temperature to meet the requirements of the test at hand. Prior to testing, the fuel subsystem 34A is engaged with the test engine 40 to provide fuel to the combustor section of the test engine 40. During the testing, the system controller 38 controls the fuel subsystem 34A to provide an appropriate flow of fuel at an appropriate point in time. Prior to testing, the engine air bleed subsystem 34B is engaged with the test engine 40. During the testing, the system controller 38 controls the engine air bleed subsystem 34B to bleed an amount of gas path flow to replicate operating conditions for the specific test at hand; e.g., continuous or selective bleeding of air from the gas path of the test engine 40 to replicate gas path air bleeding during takeoff, during ascent, cruise, during descent, and the like. Prior to testing, the test engine 40 may be engaged with a device configured to apply a load on the test engine 40. During testing, the engine load subsystem 34F is controlled to apply an appropriate amount of load at an appropriate time and for an appropriate duration to replicate engine operating conditions during flight segments such as takeoff, ascent, cruise, descent, and the like. Prior to testing, the security subsystem 36 is engaged and verified; e.g., the security subsystem 36 may be controlled to verify that fire detection devices are properly operating, and fire detection devices are operational, and no fuel leakage or fumes are sensed. In those security subsystems 36 that include a personnel presence detector, the personnel presence detector(s) may be operated to verify that the test cell is clear of personnel.

Prior to the initiation of testing, the system controller 38 may control the present disclosure to run through a pre-test verification sequence (e.g., via stored instructions) that verifies all appropriate subsystems are properly configured and/or operating to perform the testing at hand. Assuming the pre-test verification sequence indicates all appropriate subsystems are operational, then the system controller 38 may start the test engine 40 and run the test engine 40 until the engine arrives at an operational status that is acceptable to begin the testing.

As stated above, during the testing, the system controller 38 (e.g., via stored instructions) controls the test engine 40 and the respective subsystems in a manner appropriate for each predetermined aspect of the testing at hand.

During the testing, a test cell operator may monitor the testing via the output devices in communication with the system controller 38; e.g., locally at the test cell 32 or remotely via communication with the system controller 38. During the monitoring, the test cell operator may input instructions into the test cell 32 via input device(s) (e.g., a PLC smart panel, a PLC HMI, a remote device in communication with the system controller 38, or the like), but that is not required in the present disclosure automated test cell 32.

During the testing, the automated test cell 32 may be configured so that the security subsystem 36 continuously monitors the present disclosure test cell. The automated test cell 32 may be configured so that components of the security subsystem 36 (e.g., fire detection devices like a smoke sensor, a heat sensor, or the like, and/or fuel leakage sensor and/or fuel fume sensors) continuously send sensor data to the system controller 38, and the system controller 38 evaluates that sensor data to determine if any threshold indicative of a problem is met, and the like. In some embodiments, the sensor data may be stored in memory. In some test cell 32 embodiments, the automated test cell 32 may be configured so that components of the security subsystem 36 send sensor data to the system controller 38 only when the signal data is indicative of a problem; e.g., a threshold is met. In some embodiments, the automated test cell 32 may be configured to have some combination of continuous reporting and event reporting.

In the event an element of the security subsystem 36 identifies an issue within the test cell, the system controller 38 is configured to take appropriate action. For example, if an engine malfunction is detected the security subsystem 36 (or other subsystem) may control the fuel subsystem 34A to shut down the flow of fuel and thereby terminate the test. As another example, if a fuel leakage or fuel fumes are detected within the test cell, the fuel subsystem 34A may be controlled to shut down the flow of fuel and thereby terminate the test. As another example, if a lubrication subsystem malfunction is detected within the test cell, the fuel subsystem 34A may be controlled to shut down the flow of fuel and thereby terminate the test. As another example, if a fire is detected in the test cell, the security subsystem 36 may be controlled to automatically a) shut down the flow of fuel; b) close the intake and/or exhaust portions of the test cell 32; c) shut down the engine lubrication system 34E; and d) initiate the fire extinguishing devices. In all of these examples, the system controller 38 of the present disclosure automated test cell 32 may be controlled to automatically provide communications to the test cell operator regarding the current status of the test cell.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An automated test cell for testing a gas turbine test engine, comprising:
   a fuel subsystem;
   an engine lubrication subsystem;

a test cell security subsystem; and a system controller in communication with the fuel subsystem, the engine lubrication subsystem, the test cell security subsystem, and a non-transitory memory storing instructions, which instructions when executed cause the system controller to:
- operate the test engine pursuant to a predetermined test cycle, including producing test data;
- control the engine lubrication subsystem to provide lubrication to the test engine pursuant to the predetermined test cycle;
- control the fuel subsystem to provide fuel to the test engine pursuant to the predetermined test cycle;
- control the test cell security subsystem to monitor an environment within the test cell; and
- report the test data.

2. The automated test cell of claim 1, wherein the instructions when executed cause the system controller to control the test cell security subsystem to monitor the test cell environment for fire.

3. The automated test cell of claim 1, wherein the monitoring of the test cell environment for fire includes sensing for combustion gases.

4. The automated test cell of claim 1, wherein the monitoring of the test cell environment for fire includes thermal sensing.

5. The automated test cell of claim 1, wherein the instructions when executed cause the system controller to control the test cell security subsystem to monitor the test cell environment for fuel leakage, and in the event a fuel leakage is detected, control the fuel subsystem to close down.

6. The automated test cell of claim 1, wherein the instructions when executed cause the system controller to control the test cell security subsystem to monitor the test cell environment for fuel fumes, and in the event said fuel fumes are detected, control the fuel subsystem to close down.

7. The automated test cell of claim 1, wherein the instructions when executed cause the system controller to control the test cell security subsystem to monitor the test cell environment for fire, and in the event fire is detected the instructions cause the system controller to control the test cell security subsystem to initiate fire extinguishing steps.

8. The automated test cell of claim 7, wherein the fire extinguishing steps include controlling one or more fire extinguishing devices.

9. The automated test cell of claim 8, wherein the fire extinguishing steps include controlling the fuel subsystem and the engine lubrication system to close down.

10. The automated test cell of claim 9, further comprising a test cell engine airflow subsystem, and the fire extinguishing steps include controlling the test cell engine airflow subsystem to stop an influx of air into the test cell in the event fire is detected.

11. The automated test cell of claim 1, further comprising an engine air bleed subsystem, and the instructions when executed cause the system controller to control the engine air bleed subsystem to bleed gas path air from a compressor section of the test engine during the predetermined test cycle.

12. The automated test cell of claim 1, further includes an engine load subsystem, and the instructions when executed cause the system controller to control the engine load subsystem to selectively apply a load to the test engine during the predetermined test cycle.

13. A method for testing a gas turbine test engine within a test cell, comprising:
- engaging the test engine with a fuel subsystem configured to selectively provide a flow of fuel to the test engine and an engine lubrication subsystem configured to selectively provide a flow of lubricant to the test engine;
- operating the test engine within the test cell using a system controller that is in communication with the fuel subsystem and the lubrication subsystem, the operation of the test engine using the system controller including operating the test engine according to a predetermined test cycle and producing test data representative of the test engine operation; and
- monitoring the operation of the test engine within the test cell during the predetermined test cycle using a test cell security subsystem that is in communication with the system controller, wherein the monitoring includes monitoring an environment within the test cell during the predetermined test cycle.

14. The method of claim 13, wherein the monitoring the operation of the test engine within the test cell during the predetermined test cycle using a test cell security subsystem includes sensing for combustion gases indicative of a fire.

15. The method of claim 14, further comprising controlling the test cell security subsystem to initiate fire extinguishing steps in the event the monitoring step detects said fire.

16. The method of claim 15, further comprising controlling the fuel subsystem and the engine lubrication system to close down in the event of said fire.

17. The method of claim 16, further comprising sealing the test cell to stop an influx of air into the test cell in the event of said fire.

18. The method of claim 13, further comprising monitoring the test cell for fuel leakage or fuel fumes during the operation of the test engine according to the predetermined test cycle.

19. The method of claim 13, further comprising using the system controller to control an engine air bleed subsystem to bleed gas path air from a compressor section of the test engine during the predetermined test cycle.

20. The method of claim 13, further comprising using the system controller to control an engine load subsystem to apply a load to the test engine during the predetermined test cycle.

* * * * *